Feb. 19, 1957   G. W. NEELY   2,781,791
SHUTTLE STRUCTURE
Filed May 16, 1955

Inventor
Glen W. Neely
By John L. Hutchinson Attorney

United States Patent Office 2,781,791
Patented Feb. 19, 1957

---

2,781,791

SHUTTLE STRUCTURE

Glen W. Neely, Wood Dale, Ill., assignor to The Richardson Company, Melrose Park, Ill., a corporation of Ohio Application May 16, 1955, Serial No. 508,424

11 Claims. (Cl. 139—196)

This invention relates to a shuttle structure and more particularly to a shuttle at least part of which is formed by a molding operation.

Heretofore the majority of shuttles have been made of wood. Wooden shuttles have a number of disadvantages such as splintering, etc. Recently manufacturers of shuttles have turned to plastics and have made shuttles either completely or in part from suitable plastic materials with or without fillers by molding or laminating.

The present invention is directed to a shuttle of the latter type having at least the ends thereof formed by a molding operation. Such shuttles are relatively inexpensive and can be made having improved properties such as increased flexual and tensile strength, as well as impact resistance.

Shuttles are usually formed with a metallic nose member, generally of conical shape, provided with a shank which extends into and is united with the shuttle end. In some instances the metallic nose member may be united with the molded end by using it as an insert in the molding operation, in other cases the molded ends may be provided with a threaded cavity and the metallic nose members threadably engaged with the shuttle ends.

It has been found that in shuttles of the foregoing type there is a tendency for the shuttle to split or crack, especially around the juncture between the metal nose member and the shuttle ends, as a result of the constant shocks to which the shuttle is subjected during use. The present invention is directed towards a structure which will eliminate this disadvantage and which will not only improve the anchorage between the metallic nose member and the molded end of the shuttle but will also provide a certain resiliency or shock absorption property.

Further, as a result of the present invention and the method of anchoring the metallic nose member into a molded end of a shuttle, cheaper molding materials may be employed and molding materials which cure or set more rapidly can be utilized.

The foregoing, and other objects will become more apparent upon a review of the specification together with the attached drawing, wherein.

Figure 1:
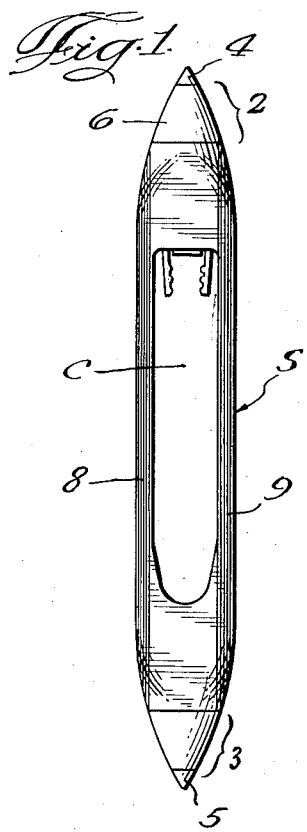
Figure 1 is a top plan view of the shuttle.

Turning now to the drawing, the letter "S" indicates generally a shuttle of the type contemplated by this invention, provided with a bobbin cavity "C" and having end portions 2 and 3, each provided with a metallic nose 4 and 5 respectively.

Figure 2:
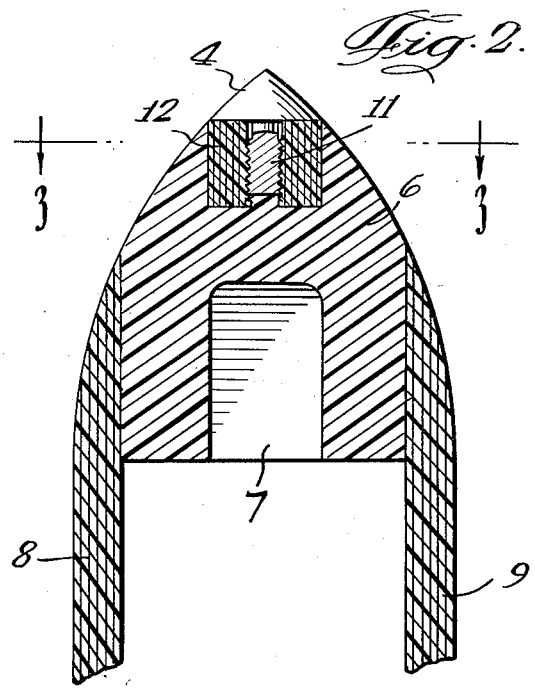
Figure 2 is a cross section of an end portion of a shuttle.
Figure 3:
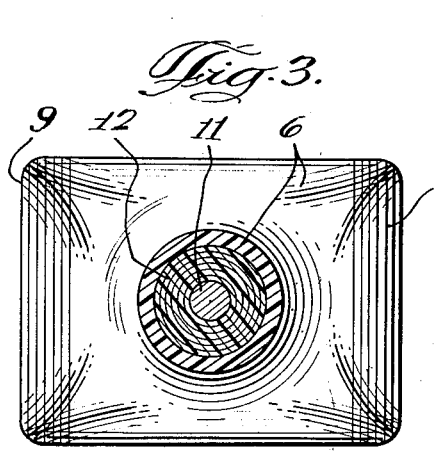
Figure 3 is a view taken along the line 3—3 of Figure 2.

Referring more specifically to Figure 2, disclosing one end of a shuttle in enlarged form, the numeral 6 designates a molded section provided with a cavity or recess 7 which is adapted to receive appropriate hardware of the type usually associated with such shuttles, and which, depending on the end of the shuttle, will serve either to hold a spindle or act as a thread guide. Section 6 is formed by molding any suitable plastic composition into the desired shape. Preferably the plastic composition consists of a thermosetting resin such as a polyester or a phenolic aldehyde, examples of the same being glycol maleate and phenol formaldehyde respectively, and contains a suitable filler, which may be cotton fiber, wood flour, etc.

United to opposite surfaces of molded section 6 are sides 8 and 9 which extend between the ends of the shuttle and complete the general assembly. These sides are preferably formed from a plurality of laminae which have been united under heat and pressure. Each lamina is composed of a filler sheet or strip composed of fabric, paper, etc., impregnated with an appropriate resin. In general the resin employed to form the sides should be compatible with the resin used as the binder for molded section 6.

Secured to section 6 is a conical shaped metallic point or nose 4, provided with a shank 11, which extends into section 6, and is embedded therein. Metallic point 4 is secured to section 6 by inserting shank 11, prior to the molding operation, into the cavity of the mold which is used to form the section, whereby the molding composition is forced around the shank during molding.

The improvement provided by this invention consists of a fibrous tube-like member 12 which is concentrically disposed about shank 11 and embedded in molded section 6.

Fibrous member 12 is preferably pre-formed prior to application about shank 11. The preforming operation may consist of impregnating a strip of appropriate fibrous filler material with a suitable resin, which is compatible with, but not necessarily the same as, the resin used as a binder in the molding composition from which section 6 is formed. The impregnating strip may be convolutely wound about a mandrel to obtain a preformed shape and subjected to a preliminary cure. Incomplete cure of the impregnating resin is necessary in order that it can be finally cured simultaneously with the binder of molded section 6, thereby forming a continuous resin phase extending through and around the tubular member 12. In order to increase the anchorage between the shank 11 and section 6 the shank is preferably serrated or threaded as indicated. For best results fibrous tubular member 12 should extend for the length of shank 11 or to a slight degree beyond, and also extend, in a lateral direction, from the shank to the outer circumference of the nose 4, thereby substantially filling the area immediately beneath the nose 4.

As an alternate structure it is contemplated that tube-like member 12 comprise a plurality of independent concentric tubes rather than a convolutely wound strip.

Tubular member 12 may be formed from a number of fibrous filler materials and in particular those derived from cellulose, glass, or synthetic resins. Further, no special weave is necessary, and, accordingly, fabrics made from such fibrous materials which are unwoven, woven, or are unidirectional may be employed in the form of suitable dimensioned strips.

In forming Section 6 of the shuttle the metallic nose 4 is disposed so that its shank 11 extends into the mold cavity and the preformed tubular member 12 placed over the shank. The mold cavity is then filled with a desired molding composition and the whole assembly subjected to a molding operation, including heat and/or pressure if a thermosetting resin is used, to form an integral unit.

Figure 4:
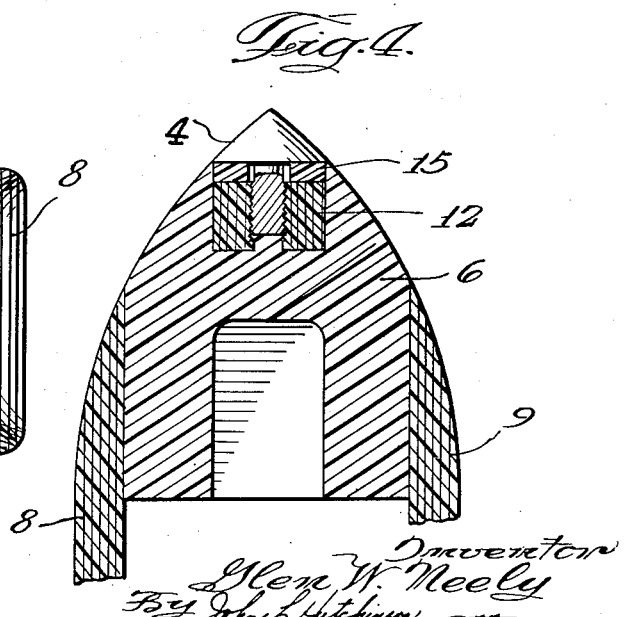
Figure 4 is a cross section of the end of a shuttle, illustrating a modification of the invention.

As a modification, it is contemplated that additional cushioning means be provided to absorb at least a part of the shock to which the nose member 4 and thus the shuttle is subjected. Such a modification is illustrated in Figure 4 wherein there is provided a washer-like member 15 disposed between the upper end of the tubular member 12 and the bottom of the metallic nose 4. This washer-like member is formed from an appropriate cushioning material impregnated with a resin compatible with the resin employed as the binder in the molding composition which is used to form section 6. One satisfactory material found to give the desired cushioning effect is composed of woven nylon fibers.

A shuttle formed in accordance with the present invention will be found to have increased bursting strength at the juncture between the shank 11 and the molded section 6, and the metallic nose member will have improved anchorage in molded section 6. Further, due to the use of a fibrous tubular type element such as member 12 about shank 11 and the resulting increase in physical properties of anchorage and bursting strength, cheaper and more rapid molding materials may be employed.

Having now described the invention in certain exemplary embodiments what is claimed is:

1. In a shuttle, a molded end formed from a synthetic resinous composition, a metal point for said end having a shank embedded therein, and a reinforcing fibrous tubular member disposed about said shank, said fibrous tubular member being resin impregnated and comprising an integral part of said molded end.

2. In a shuttle as described in claim 1 wherein said fibrous tubular member is impregnated with the same resin as that comprising the binder of said resinous composition.

3. In a shuttle as described in claim 1 wherein said fibrous tubular member is impregnated with a resin different from but compatible with the resin comprising the binder of said resinous composition.

4. In a shuttle, as described in claim 1 wherein the fibrous tubular member is composed of a plurality of laminations.

5. In a shuttle, as described in claim 1, wherein the fibrous tubular member comprises a convolutely wound fibrous strip.

6. In a shuttle, a molded end formed from a resinous binder containing a fibrous filler, a conical-shaped metal point for said end having a shank embedded therein, and a concentrically disposed reinforcing fibrous tubular member integral with said molded end surrounding said shank and having a length substantially equivalent to the length of said shank.

7. In a shuttle as described in claim 6 wherein the resinous binder is a thermosetting resin.

8. In a shuttle, a molded end, a conical-shaped metal point for said end having a shank embedded therein, and a concentrically disposed reinforcing fibrous tubular member surrounding said shank, said tubular member integral with said molded end having a thickness such that it extends in a lateral direction substantially completely beneath the conical-shaped metal point.

9. In a shuttle, a molded end, a conical-shaped metal point for said end having a shank embedded therein, a concentrically disposed reinforcing fibrous tubular member surrounding said shank, and a separate fibrous washer-like member surrounding said shank and disposed between the top of said tubular member and the bottom of said metal point.

10. In a shuttle as described in claim 9, wherein the washer-like member is composed of woven nylon fibers.

11. In a shuttle, a molded end consisting of a thermosetting resinous binder and a fibrous filler a conical-shaped metal point for said end having a shank embedded therein, and a concentrically disposed reinforcing fibrous tubular member surrounding said shank, said fibrous tubular member being pre-impregnated with a thermosetting resin compatible with said thermosetting resinous binder.

References Cited in the file of this patent

UNITED STATES PATENTS

| 82,090 | Clough et al. | Sept. 15, 1868 |
| 1,805,090 | Hills | May 12, 1931 |
| 2,282,191 | Kaufmann | May 5, 1942 |
| 2,658,533 | Gosselin | Nov. 10, 1953 |
| 2,699,186 | Gosselin | Jan. 11, 1955 |